(12) United States Patent
Bromba et al.

(10) Patent No.: US 6,466,781 B1
(45) Date of Patent: Oct. 15, 2002

(54) BIOMETRIC AUTHENTICATION TECHNOLOGY FOR WIRELESS TRANSCEIVER ACTIVATION

(75) Inventors: Manfred Bromba; Bernhard Raaf, both of München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/694,436

(22) Filed: Oct. 23, 2000

Related U.S. Application Data

(63) Continuation of application No. PCT/DE99/00792, filed on Mar. 19, 1999.

(30) Foreign Application Priority Data

Apr. 23, 1998 (DE) .......................................... 198 18 324

(51) Int. Cl.7 ........................... H04M 1/66; H04M 1/68; H04M 3/16
(52) U.S. Cl. ........................ 455/411; 455/410; 455/574; 382/115; 380/247; 340/5.82
(58) Field of Search ................................. 455/410, 411, 455/574, 127, 550, 556–558, 575; 380/247; 382/124, 115; 340/5.52, 5.53, 5.82, 5.83, 5.74

(56) References Cited

U.S. PATENT DOCUMENTS

| 5,903,914 A | * | 5/1999 | Zulian ......................... 711/163 |
| 6,145,083 A | * | 11/2000 | Shaffer et al. ............... 455/410 |
| 6,154,727 A | * | 11/2000 | Karp et al. .................. 455/404 |
| 6,198,823 B1 | * | 3/2001 | Mills ........................... 455/411 |
| 6,219,793 B1 | * | 4/2001 | Li et al. ...................... 713/202 |
| 6,230,002 B1 | * | 5/2001 | Floden et al. ............... 455/411 |

FOREIGN PATENT DOCUMENTS

| DE | 93 04 488 U1 | * | 7/1993 |
| GB | 2 148 569 A | * | 5/1985 |

* cited by examiner

Primary Examiner—Vivian Chin
Assistant Examiner—Eliseo Ramos-Feliciano
(74) Attorney, Agent, or Firm—Laurence A. Greenberg; Werner H. Stemer; Gregory L. Mayback

(57) ABSTRACT

The invention is based on a transceiver for which two different off-states are provided. The user authentication module is not supplied with power in a first off-state whereas it is already supplied with power in a second off-state.

7 Claims, 1 Drawing Sheet

BIOMETRIC AUTHENTICATION TECHNOLOGY FOR WIRELESS TRANSCEIVER ACTIVATION

CROSS-REFERENCE TO RELATED APPLICATION

This is a continuation of copending International Application PCT/DE99/00792, filed Mar. 19, 1999, which designated the United States.

BACKGROUND OF THE INVENTION

Field of the Invention

Access to modern transceivers, especially mobile radio terminals which operate in accordance with the GSM (Global System for Mobile Communication) standard, and, respectively, their use in a mobile radio system is protected by a secret number, a so-called personal identification number (PIN). This also includes the protection of access to certain data or services even if these are not provided by the transceiver but by other devices in a computer network or communication network.

Probably the most frequent manner of inputting an authentication information item at present is by inputting it via a keypad of the device. After the input, the correctness of the information input, and thus the authorization of the inputting user is checked by a test facility,in the device or in a computer network or communication network. In the case of mobile radio terminals according to the GSM standard, this is done by a data processing facility in the user authentication module, the so-called SIM card of the transceiver, which checks whether the PIN that has been input matches the information stored in the SIM card. If this is so, the SIM card enables the mobile radio terminal for use. The security of the user is increased by the fact that, according to the GSM standard, the PIN must not be stored in the transceiver but may only be stored in inaccessible form on the SIM card.

Technologies allowing other forms of authentication of a user have been available for some time. These technologies are based on detecting user-specific biometric features by means of special sensors. An important example of this are sensors for detecting a fingerprint. Other biometric features such as, e.g. the retinal texture of the human eye or the characteristic of a human voice are also already used in some devices.

The features detected by the sensors are usually compared with known features of an authorized user in a data processing facility of the device or of a communication network and, if an adequate match is produced, access to the desired service, the required data or the selected device function is enabled.

In some device types, it appears to be reasonable to combine two types of authentication with one another. In the case of mobile radio terminals, for example, it is surely desirable that these cannot only be used by their owner by means of a fingerprint sensor but that other persons who were informed of the PIN or who would like to use the device with their own user authentication module, the SIM card, are capable of using it within the scope of the authorization which they have been allowed. In addition, the authentication by means of fingerprint could occasionally fail or be impossible to carry out, e.g. because the hands of the user are dirty or the user is wearing gloves. For these or similar reasons, it is desirable or necessary that one or more users of a device can authenticate themselves on this device via different ways. In these cases, biometric authentication should be possible in addition to authentication by PIN input. In the case of mobile radio terminals according to the GSM standard, there is also the fact that the standard mandatorily prescribes the possibility of authentication by PIN input.

The result of the situation described is that a use of conventional biometric authentication methods is not possible in mobile radio terminals according to the GSM standard because these mandatorily require authentication via the PIN with the SIM card for reasons of compatibility with the GSM standard. The possibility which at first appears to be available, of storing the PIN in the device and, when the check of the match of the detected fingerprint with the stored fingerprint of an authorized user is successful, transferring this stored PIN to the SIM card for testing, cannot be used because storage of the PIN in the mobile radio terminal at another place than within the SIM card is prohibited by the GSM standard for security reasons. In these cases, the biometric authentication could only be considered as an additional safeguard. However, such an additional safeguard is not required in view of the high security of the authentication of the PIN input and would probably not be acceptable by many users.

SUMMARY OF THE INVENTION

It is accordingly an object of the invention to provide a transceiver which overcomes the above-mentioned disadvantageous of the prior art apparatus of this general type. The transceiver enables a biometric user authentication to be combined, in a manner convenient for the user, with an authentication by inputting a secret number even in the case of mobile radio terminals according to the GSM standard or in similar types of cases.

With the foregoing and other objects in view there is provided, in accordance with the invention a transceiver, that includes: means for transmitting and receiving information selected from the group consisting of signaling information and user information; control means for placing the transceiver into different states including a plurality of off-states; an operating device for triggering changes between the different states; a user authentication module; means for performing a first user authentication which is based on an input secret number; means for performing a second user authentication which is based on a biometric method; and means for optionally switching the transceiver into the plurality of off-states which include: a first off-state in which essential elements of the transceiver and said user authentication module are not supplied with power, and a second off-state in which essential elements of the transceiver are not supplied with power and said user authentication module is supplied with power.

It is accordingly an object of the invention to provide a transceiver that can optionally be placed into one of two different off-states of the device:

In the first off-state of the device, the user authentication module is not supplied with power. As a result, the comparison of a secret number stored in the user authentication module with a secret number which is input must be mandatorily carried out before a change into an on-state or before communication via the transceiver.

In the second off-state of the device, the user authentication module is already supplied with power. As a result, comparison of the input secret number and the stored secret number is not mandatorily necessary before communication via the transceiver. Thus, for a change from the second off-state of the device to an on-state of the device, in which communication via the transceiver is possible, a user authentication based on a biometric method can be taken as given.

Other features which are considered as characteristic for the invention are set forth in the appended claims.

Although the invention is illustrated and described herein as embodied in a transceiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
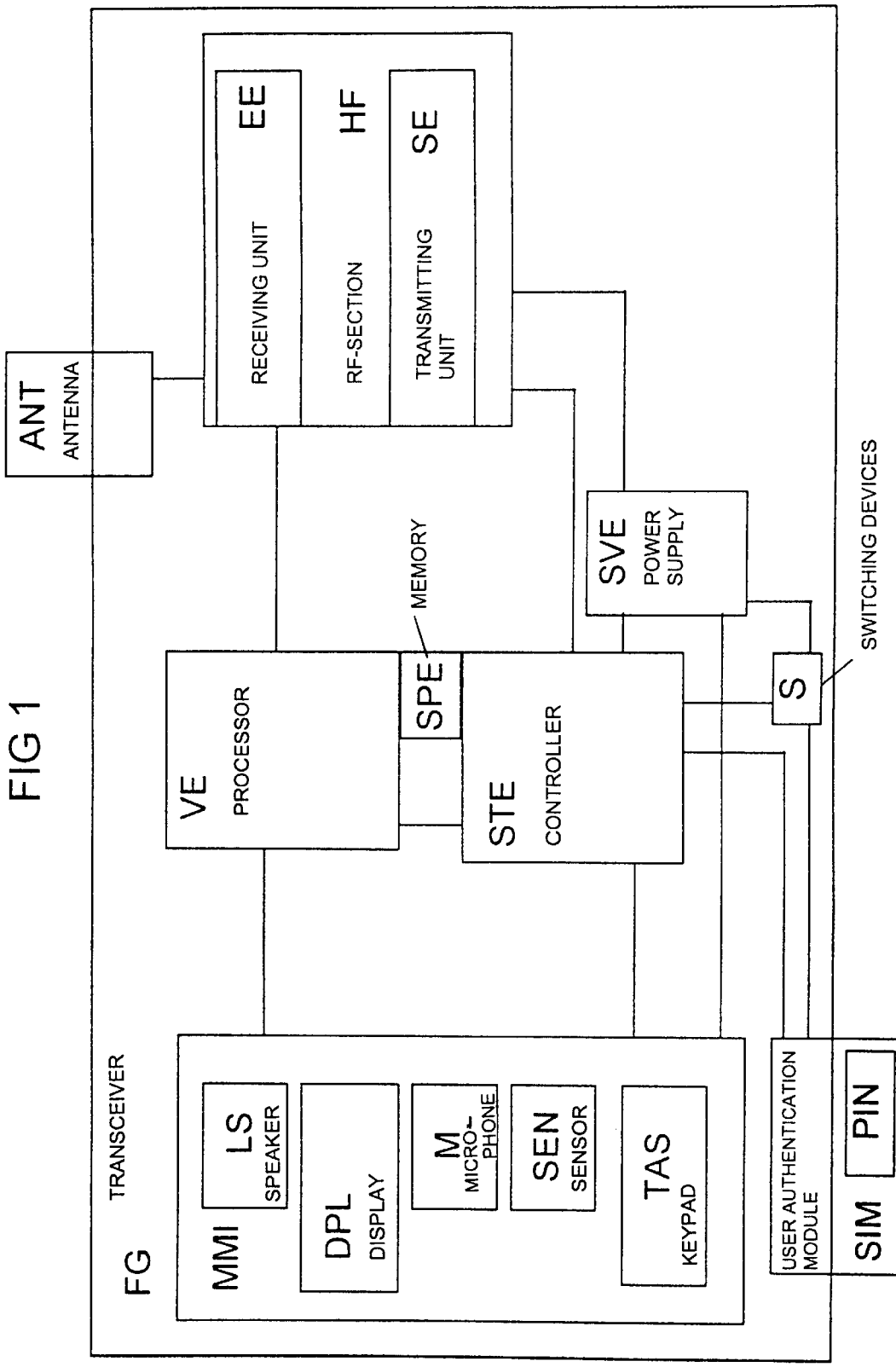
FIG. 1 shows a block diagram of a transceiver.

Referring now to the sole drawing figure in detail, namely FIG. 1, there is shown a transceiver FG consisting of an operating unit MMI, a controller STE and a processor VE, a power supply SVE, a user authentication module SIM, a radio frequency section HF consisting of a receiving facility EE, a transmitting facility SE and a frequency synthesizer SYN and an antenna facility ANT. The individual elements of the transceiver FG are also connected to one another by means of conductor tracks, wires, cables or bus systems.

The operating unit MMI consists of a loudspeaker element LS for reproducing audio signals and a microphone element M for registering audio signals. In addition, the operating unit MMI is provided with a keypad TAS for inputting numbers and letters and for selecting menu points. Menu points, numbers or other information items relevant to the communication sequence can be displayed via a display DPL. In addition, sensor means SEN are provided for detecting biometric features such as, for example, fingerprints.

The controller STE essentially consists of a program-controlled microcontroller and the processor VE consists of a digital signal processor, both having read and write access to memory chips SPE. The microcontroller controls and checks all essential elements and functions of the transceiver FG and essentially controls the communication and signaling sequence. Placing the transceiver FG into defined device states and switching particular hardware elements of the transceiver FG or of its power supply on and off by means of suitable switching devices S is also controlled by the controller STE.

The program data which are needed for controlling the transceiver FG and the communication sequence, especially also the signaling procedures, device information, user-input information, information produced during the processing of signals and reference data of biometric features of authorized users are stored in the volatile or non-volatile memory chips SPE.

The essential elements of the transceiver and the user authentication module SIM are supplied with power by means of the power supply SVE which can be provided with batteries.

The radio-frequency section HF consists of a transmitting facility SE comprising a modulator and an amplifier, and a receiving facility EE comprising a demodulator and also an amplifier. The transmitting facility SE and the receiving facility EE are supplied with the frequency of a voltage-controlled oscillator via the synthesizer SYN.

An antenna facility ANT is provided for receiving and transmitting user and/or signaling information via the air interface of a mobile radio system.

In addition, the transceiver FG has a slot and a user authentication module SIM which can be plugged into this slot and on which subscriber-specific and network-specific information such as a secret number PIN and information needed for authentication by the mobile radio system are stored or, respectively, calculated. The power supply of the user authentication module SIM, which can be implemented by a chip card, is switched on or off, respectively, by a switching device S controlled by the controller STE.

At first, the transceiver FG is in a first off-state of the device in which essential elements of the transceiver FG—at least the radio-frequency section HF and the user authentication module SIM are not supplied with power.

To leave the first off-state of the device, the user operates an on-key whereupon at least the controller STE and the operating unit MMI are supplied with power and the user is requested to input the secret number PIN by means of a suitable display indication. After the correct secret number PIN has been input, which is verified by a comparison with the secret number PIN stored in the user authentication module SIM, the mobile-radio-system-specific authentication procedure is triggered and performed. For this purpose, identifiers are also calculated in the user authentication module SIM, exchanged with the mobile radio system via the air interface, compared with identifiers stored in databases or authentication centers, respectively, and finally the transceiver FG is registered in the mobile radio system.

In accordance with a stored presetting, the device is now automatically, or after a corresponding key actuation by the user, placed either in an on-state or ready-for-communication state in which the device, for example, is ready for reception or in which connections to other subscribers can be set up via the mobile radio system, or placed into the second off-state of the device in which essentially only the user authentication module SIM is now supplied with power, or a second user authentication method is performed which is based on a biometric method.

Performing the authentication method based on the biometric method can also be triggered in the second off-state of the device by operating a corresponding key.

After the automatic or user-requested triggering of the biometric authentication method, at least the operating unit MMI, the processor VE, the controller STE and, furthermore, the user authentication module SIM are initially supplied with power. Then the biometric authentication method is performed which will be described by way of example in the text which follows, with reference to a fingerprint detection process.

A fingerprint sensor SEN detects the line pattern of the fingertip in that the sensor cells register the changes in the electric field caused by the raised lines and the indentations in the finger surface, and generate from this its electrical image. The detection can be based on a capacitive measuring principle in which each pixel represents a capacitor and the skin of the finger placed on it acts as a third capacitor plate. The feedback capacitance produced in the individual sensor elements by the raised and indented parts of the groove pattern provide analog values which supply a three-dimensional record of the print. Moreover, since the conductivity of the skin influences the signal, the sensor cannot be fooled by a wax dummy, either. After these analog values are analog/digital converted, the corresponding digital signals are transferred to the processor VE, especially a digital signal processor. In the digital signal processor, unmistakable features are calculated from the fingerprint values via suitable image processing algorithms and are compared with the corresponding unmistakable features which are stored in the memory chips SPE of the transceiver FG or in the user authentication module SIM as reference data of authorized users. If the features found and the stored features match, an enable signal is transmitted to the controller STE or, respectively, in the case of significant differences between the information found and the information stored, no enable signal is transmitted to the controller STE.

After the second user authentication method has also been performed successfully, the transceiver FG is placed into an on-state or ready-for-communication state in which the radio-frequency section is also supplied with power, at least from time to time.

To place the device into an off-state from the on-state, there are two possibilities which can be optionally selected either automatically in accordance with a presetting or by the user via the operating device MMI:

the transceiver FG is placed into the first off-state of the device in which neither essential elements of the transceiver FG nor the user authentication module SIM are supplied with power;

the transceiver FG is placed into the second off-state of the device in which essential elements of the transceiver FG, at least the radio-frequency section, are not supplied with power but the user authentication module SIM is still continuously supplied with power.

To get from the second off-state of the device into an on-state of the device, it is now not necessary to input a secret number but it is sufficient to perform the biometric authentication method successfully.

According to an embodiment of the invention, it is provided that, at least in the case of a battery change or in the case of a failure of the power supply SVE due to another cause, at least the user authentication module SIM continues to be supplied with power by a buffer capacitor connected in parallel with the power supply SVE.

Another further development of the invention provides that the successful performance of the biometric authentication method is also necessary before certain functions are carried out such as, for example, the initiation of signaling procedures or the access to the telephone directory etc.

We claim:

1. A transceiver, comprising:
    means for transmitting and receiving information selected from group consisting of signaling information and user information;
    control means for placing the transceiver into different states including a plurality of off-states;
    an operating device for triggering changes between the different states;
    a user authentication module storing a secret number, said user authentication module embodied as an interchangeable chip card;
    means for performing a first user authentication which is based on an input secret number, said means for performing a first user authentication comparing the input secret number with stored secret number;
    means for performing a second user authentication which is based on a biometric method; and
    means for optionally switching the transceiver into the plurality of off-states which include:
    a first off-state in which essential elements of the transceiver and said user authentication module are not supplied with power, and
    a second off-state in which essential elements of the transceiver are not supplied with power and said user authentication module is supplied with power;
    successful performance of the second user authentication causes a change from the second off-state into an on-state; and
    successful performance of the first user authentication enables a change from the first off-state into a state selected from the group consisting of the second off-state and an on-state.

2. The transceiver according to claim 1, wherein
    in the first off-state, the first user authentication which is based on the input secret number cannot be performed; and
    in the second off-state, the second user authentication which is based on a biometric method can be performed.

3. The transceiver according to claim 1, wherein the state of the transceiver following the first off-state is selected automatically in accordance with a presetting.

4. The transceiver according to claim 1, wherein the state of the transceiver following the first off-state is selected by a user via said operating device.

5. The transceiver according to claim 1, wherein the state of the transceiver which follows an on-state is selected automatically in accordance with a presetting and is one of the plurality of off-states.

6. The transceiver according to claim 1, wherein the state of the transceiver that follows an on-state is an off-state that is selected by the user via said operating device.

7. The transceiver according to claim 1, wherein in the second off-state, said user authentication module can also be supplied with power by a buffer capacitor.

* * * * *